US008756605B2

(12) United States Patent
Aingaran et al.

(10) Patent No.: US 8,756,605 B2
(45) Date of Patent: Jun. 17, 2014

(54) METHOD AND APPARATUS FOR SCHEDULING MULTIPLE THREADS FOR EXECUTION IN A SHARED MICROPROCESSOR PIPELINE

(75) Inventors: Kathirgamar Aingaran, Sunnyvale, CA (US); Hong-Men Su, San Mateo, CA (US)

(73) Assignee: Oracle America, Inc., Redwood City, CA (US)

( * ) Notice: Subject to any disclaimer, the term of this patent is extended or adjusted under 35 U.S.C. 154(b) by 2538 days.

(21) Appl. No.: 11/015,055

(22) Filed: Dec. 17, 2004

(65) Prior Publication Data
US 2006/0136915 A1 Jun. 22, 2006

(51) Int. Cl.
G06F 9/46 (2006.01)
(52) U.S. Cl.
USPC .......................................................... 718/103
(58) Field of Classification Search
None
See application file for complete search history.

(56) References Cited

U.S. PATENT DOCUMENTS

| 5,712,791 | A | | 1/1998 | Lauterbach | 364/489 |
|---|---|---|---|---|---|
| 5,862,450 | A | | 1/1999 | Mandal et al. | 455/3.1 |
| 5,933,627 | A | | 8/1999 | Parady | 395/569 |
| 6,016,542 | A | | 1/2000 | Gottlieb et al. | 712/225 |
| 6,076,157 | A | * | 6/2000 | Borkenhagen et al. | 712/228 |
| 6,078,944 | A | * | 6/2000 | Enko et al. | 718/105 |
| 6,092,154 | A | | 7/2000 | Curtis et al. | 711/137 |
| 6,098,169 | A | | 8/2000 | Ranganathan | 712/227 |
| 6,141,692 | A | | 10/2000 | Loewenstein et al. | 709/234 |
| 6,163,839 | A | * | 12/2000 | Janik et al. | 712/219 |
| 6,247,121 | B1 | | 6/2001 | Akkary et al. | 712/239 |
| 6,272,520 | B1 | | 8/2001 | Sharangpani et al. | 709/108 |
| 6,295,600 | B1 | | 9/2001 | Parady | 712/228 |
| 6,308,279 | B1 | | 10/2001 | Toll et al. | 713/323 |
| 6,314,563 | B1 | | 11/2001 | Agesen et al. | 717/9 |
| 6,535,905 | B1 | | 3/2003 | Kalafatis et al. | 709/108 |
| 6,578,137 | B2 | | 6/2003 | Parady | 712/228 |
| 6,609,193 | B1 | | 8/2003 | Douglas et al. | 712/219 |
| 6,625,654 | B1 | | 9/2003 | Wolrich et al. | 709/230 |
| 6,633,984 | B2 | | 10/2003 | Susser et al. | 713/201 |
| 6,671,707 | B1 | | 12/2003 | Hudson et al. | 707/206 |
| 6,700,410 | B2 | | 3/2004 | Ebergen | 326/93 |
| 6,700,825 | B1 | | 3/2004 | Ebergen | 365/221 |

(Continued)

FOREIGN PATENT DOCUMENTS

| WO | WO 99/21082 | 4/1999 |
|---|---|---|
| WO | WO 01/46827 | 6/2001 |

OTHER PUBLICATIONS

R. Heald et al., "A Third-Generation SPARC V9 64-b Microprocessor," IEEE JSSC, Nov. 2000, pp. 1526-1538.

(Continued)

*Primary Examiner* — Mengyao Zhe
(74) *Attorney, Agent, or Firm* — Osha Liang LLP (57) ABSTRACT

An apparatus and method for scheduling execution of multiple threads on a shared processor resource is described in connection with a multithreaded multiprocessor chip. Using a thread selection policy that switches between available threads every cycle to give priority to the least recently executed or scheduled threads, different threads are able to operate in a way that ensures no deadlocks or livelocks while maximizing aggregate performance and fairness between threads. Prioritization is accomplished by monitoring and sorting thread status information for each thread, including speculative states in which a thread may be speculatively scheduled, thereby improving usage of the execution pipeline by switching a thread in with a lower priority.

18 Claims, 8 Drawing Sheets

(56) References Cited

U.S. PATENT DOCUMENTS

| | | | | |
|---|---|---|---|---|
| 6,714,960 | B1* | 3/2004 | Bitar et al. | 718/103 |
| 7,051,330 | B1* | 5/2006 | Kaler et al. | 718/106 |
| 2001/0034753 | A1 | 10/2001 | Hildebrand | 709/107 |
| 2001/0042090 | A1 | 11/2001 | Williams | 709/102 |
| 2001/0047468 | A1 | 11/2001 | Parady | 712/228 |
| 2002/0007387 | A1 | 1/2002 | Ginsberg | 709/102 |
| 2002/0046230 | A1 | 4/2002 | Dieterich et al. | 709/107 |
| 2002/0052926 | A1 | 5/2002 | Bush et al. | 709/217 |
| 2002/0129309 | A1 | 9/2002 | Floyd et al. | 714/724 |
| 2002/0174166 | A1 | 11/2002 | Ang | 709/107 |
| 2003/0046517 | A1 | 3/2003 | Lauterbach | 712/214 |
| 2003/0081615 | A1 | 5/2003 | Kohn et al. | 370/395.42 |
| 2003/0084309 | A1 | 5/2003 | Kohn | 713/189 |
| 2003/0088610 | A1 | 5/2003 | Kohn et al. | 709/107 |
| 2003/0093614 | A1 | 5/2003 | Kohn et al. | 711/105 |
| 2003/0097518 | A1 | 5/2003 | Kohn et al. | 711/5 |
| 2003/0105756 | A1 | 6/2003 | Daynes | 707/8 |
| 2003/0105907 | A1 | 6/2003 | Kohn et al. | 710/305 |
| 2003/0120825 | A1 | 6/2003 | Avvari et al. | 709/316 |
| 2003/0149861 | A1 | 8/2003 | Becker | 712/214 |
| 2003/0163645 | A1 | 8/2003 | Tremblay et al. | 711/137 |
| 2003/0191927 | A1 | 10/2003 | Joy et al. | 712/228 |
| 2003/0195916 | A1 | 10/2003 | Putzolu | 709/102 |
| 2003/0208521 | A1 | 11/2003 | Brenner et al. | 709/103 |
| 2003/0212874 | A1 | 11/2003 | Alderson | 711/170 |
| 2004/0002974 | A1 | 1/2004 | Kravitz et al. | 707/8 |
| 2004/0003208 | A1 | 1/2004 | Damron | 712/225 |
| 2004/0003211 | A1 | 1/2004 | Damron | 712/228 |
| 2004/0006633 | A1 | 1/2004 | Chandra et al. | 709/231 |
| 2004/0034853 | A1 | 2/2004 | Gibbons et al. | 717/174 |
| 2004/0073906 | A1 | 4/2004 | Chamdani et al. | 718/102 |
| 2004/0187120 | A1 | 9/2004 | Moore et al. | 718/100 |
| 2004/0226014 | A1 | 11/2004 | Moore | 718/100 |
| 2006/0117316 | A1* | 6/2006 | Cismas et al. | 718/103 |

OTHER PUBLICATIONS

"Igniting a Computing Revolution! Throuput Computing," Sun Microsystems Brochure.

"Introduction to Throughput Computing," Sun Microsystems whitepaper, Feb. 2003.

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," User's Manual Supplement, Sun Microsystems, version 1.0 (Apr. 2004).

"UltraSPARC® IV Processor," Datasheet, Sun Microsystems.

"The UltraSPARC® IIIi Processor" Architecture Overview, Technical Whitepaper, Sun Microsystems, version 1.2 (Apr. 2004).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the $27^{th}$ ISCA (Jun. 2000).

L. Hammond et al., "The Stanford Hydra CMP," IEEE Micro, pp. 71-84, (Mar.-Apr. 2000).

L. Hammond et al., "Considerations in the Design of Hydra: A Multiprocessor-on-a-Chip Microarchitecture," Technical Report No. CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

P. Kongetira, "A 32-way Multithreaded SPARC® Processor," Hot Chips 16, Sun Microsystems, Inc., Aug. 22-24, 2004.

M. Azizi, "Concurrent Hardware/Software Coverification with Java Threads," Proc. Intern. Conf. on Parallel Computing in Electrical Engineering, Warsaw, Poland, Sep. 22-25, 2002.

Search Report for Application No. GB0525139.2 dated Feb. 28, 2006.

* cited by examiner

METHOD AND APPARATUS FOR SCHEDULING MULTIPLE THREADS FOR EXECUTION IN A SHARED MICROPROCESSOR PIPELINE

BACKGROUND OF THE INVENTION

1. Field of the Invention

The present invention relates generally to the field of processor or computer design and operation. In one aspect, the present invention relates to the design and operation of a multithreaded processor.

2. Description of the Related Art

Figure 1:
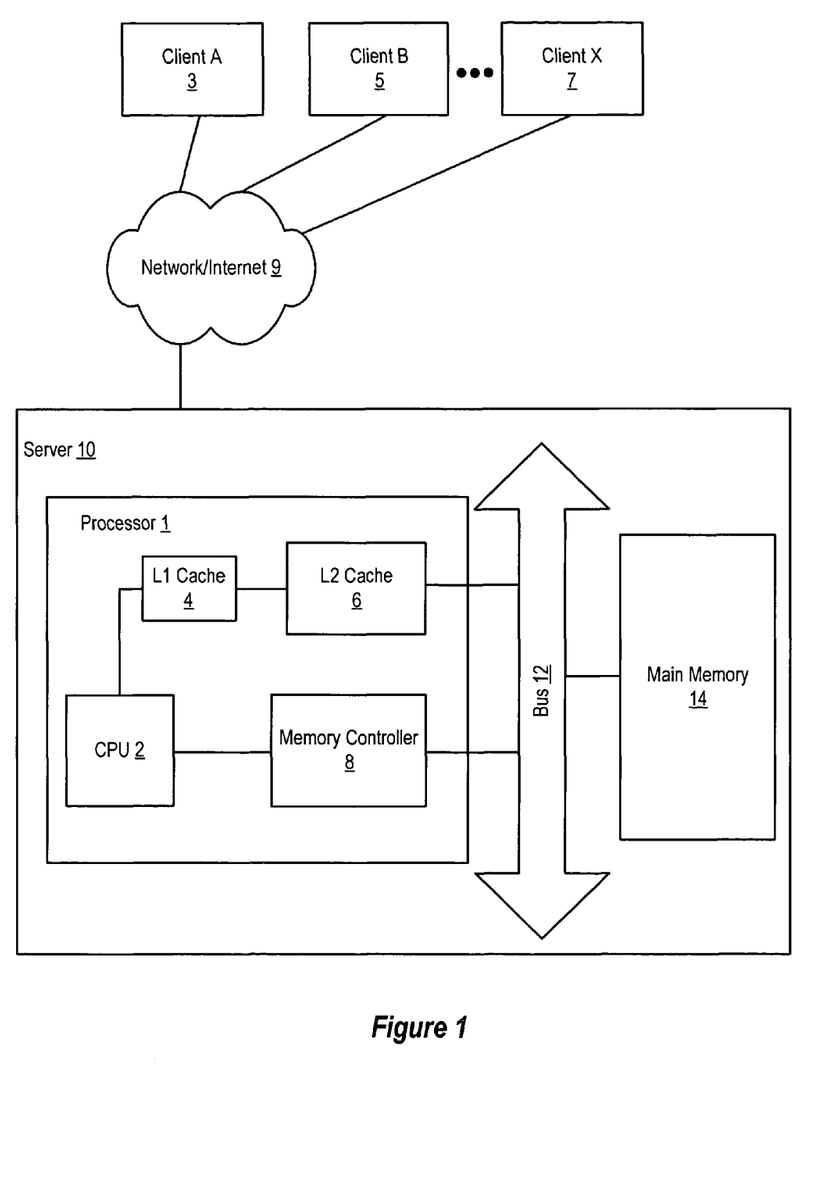
FIG. 1 illustrates a computer system in a communication network.

Computer systems are constructed of many components, typically including one or more processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet or other network 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years, roughly one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

Figure 2A:
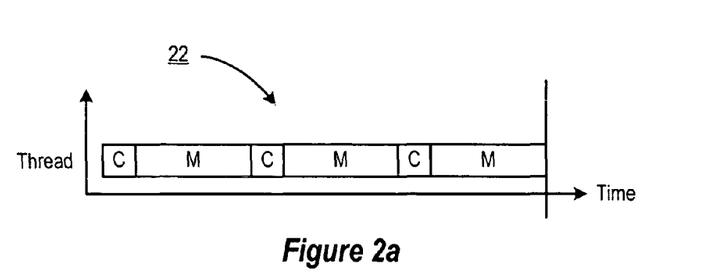
FIGS. 2a and 2b are timing diagrams respectively illustrating execution flows of a single-thread processor and a vertical multithread processor.
Figure 2B:
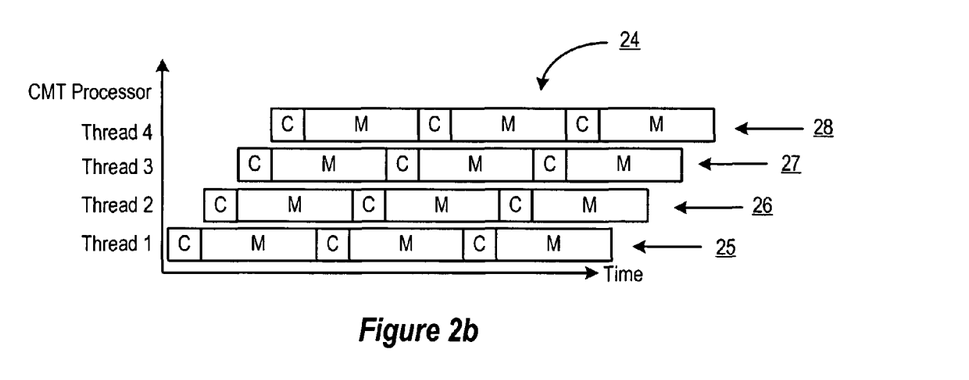

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications, spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical database application executes instructions about 25% of the time with the remaining 75% of the time elapsed in a stalled condition. The 25% utilization rate exemplifies the inefficient usage of resources by a single-thread processor.

FIG. 2b is a highly schematic timing diagram showing execution flow 24 of similar database operations by a multi-thread processor. Applications, such as database applications, have a large amount inherent parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls (for example, first thread 25), another thread (such as second thread 26) switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading presents challenges for scheduling execution of the various threads on a shared processor core or pipeline in a way that ensures correctness, fairness and maximum performance.

Accordingly, an improved method and system for scheduling thread execution on a shared microprocessor core are needed that are economical in resources and avoid costly overhead which reduces processor performance. In addition, there is a need to efficiently and fairly schedule the execution of multiple threads on a shared execution resource. There is also a need to provide a thread scheduling mechanism that maximizes multithreaded processor performance. Further limitations and disadvantages of conventional systems will become apparent to one of skill in the art after reviewing the remainder of the present application with reference to the drawings and detailed description which follow.

SUMMARY OF THE INVENTION

Broadly speaking, the present invention is a method and system for providing efficient and fair scheduling of thread execution in a multithreaded processor. In a selected embodiment, a "least recently executed" policy is used to prioritize threads for execution based on the thread status information by tracking the status of each thread in status registers and using thread selection logic to sort the threads in a priority register for execution. By taking into account speculative thread conditions when prioritizing thread execution, the efficiency of the multithreaded processor is improved. Thread prioritization may also account for threads that have been suspended (i.e., idled or halted).

In accordance with various embodiments of the present invention, a method and apparatus provide for scheduling of multiple threads for execution on a shared processor pipeline or device by maintaining one or more thread status registers and thread order registers that are used to prioritize and schedule threads for execution. For each thread, the thread status register tracks any one or more of a predetermined idle state, a ready state, a speculative ready state, a run state, a speculative run state and at least one wait state. In addition, the thread order register tracks a thread execution order defining which thread was least recently executed. Using the information maintained in the thread status register(s), the threads are scheduled for execution by assigning a first priority (e.g., highest priority) to any thread that is in a predetermined idle state, a second priority (e.g., below the first or highest priority) to a thread that is in a ready state, a third priority (e.g., below the second priority) to a thread that is in a speculative ready state, and a fourth priority (e.g., lowest or below the third priority) to a thread that is in either a run state or a speculative run state. Using the information maintained in the thread order register(s), any priority ties in the ready state or in the speculative ready state are broken by giving priority to whichever thread was least recently executed. One or more wait states for each thread (such as a a first state for waiting for an instruction fill operation, a second state for waiting for room in a store buffer and a third state for waiting for a long latency operation) may be tracked in the thread status register(s) or in a separate wait register which is updated when a condition causing a wait state clears. The scheduling functionality may be implemented as an article of manufacture having stored instructions which, when executed by a shared processing pipeline or device, cause the processing pipeline or device to schedule execution of multiple threads on said processing pipeline or device.

The objects, advantages and other novel features of the present invention will be apparent to those skilled in the art from the following detailed description when read in conjunction with the appended claims and accompanying drawings.

DETAILED DESCRIPTION

As explained herein, when multiple threads are available for execution by a shared processor resource, the processor switches between available threads by giving priority to the least recently executed thread, taking into account active, speculative and suspended thread states. For purposes of providing an exemplary and not limiting description, it will be useful to describe the various aspects and embodiments of the invention herein in the context of a processor chip having multiple processor cores for executing multiple threads. However, the present invention may be used in connection with any multithreaded processor, including without limitation, any processor chip having one or more processor cores.

Figure 3:
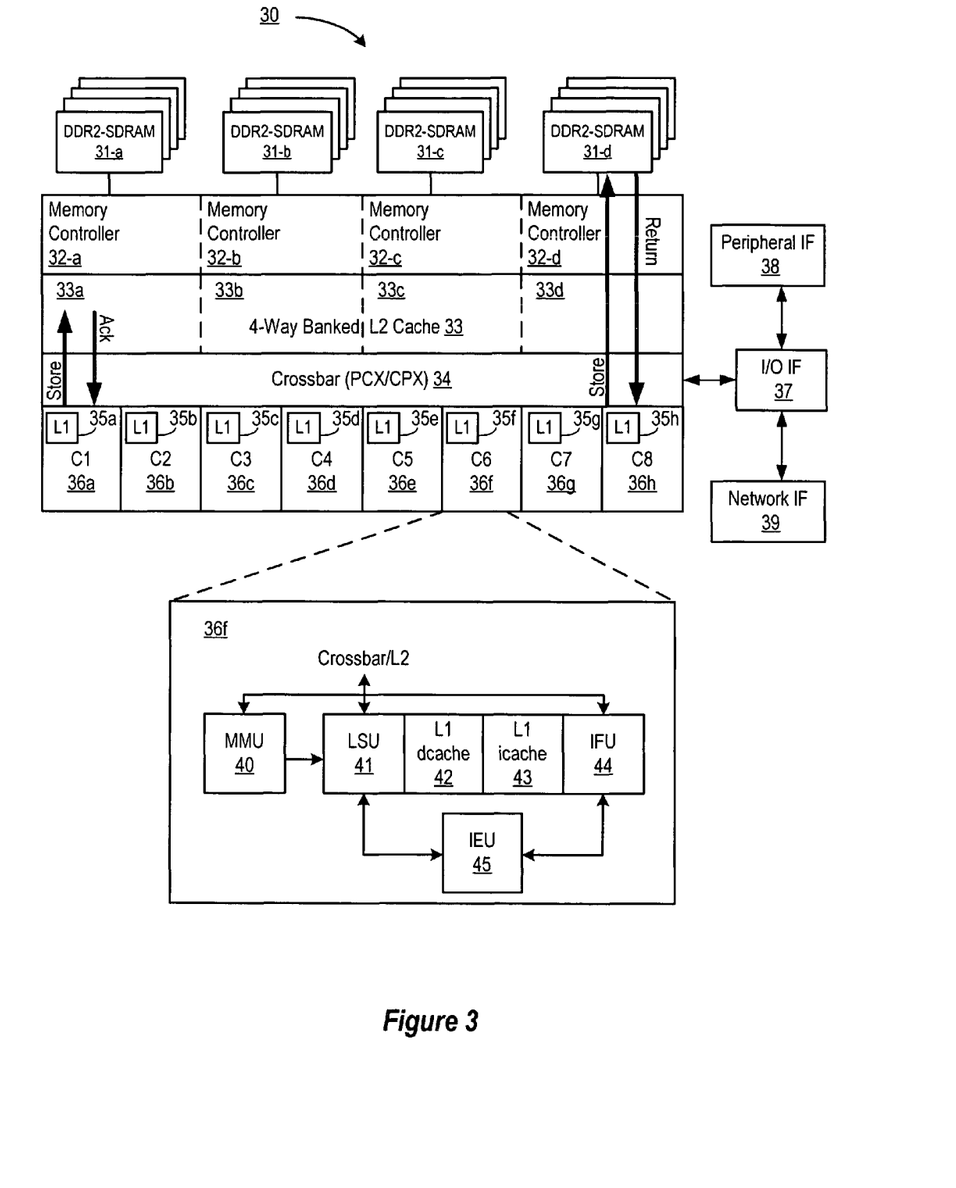
FIG. 3 illustrates a simplified schematic diagram of a processor chip having multiple processor cores for executing multiple threads, wherein each core contains a first level cache and the multiple cores share a second level cache.

A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD or IBM. However, any other suitable single or multiple microprocessors, microcontrollers or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes four threads. Thus, a single processor chip 30 with eight cores (C1 through C8) will have thirty-two threads in this configuration. However, it should be appreciated that the invention is not limited to eight processor cores, and that more or fewer cores can be included. In other embodiments, it is contemplated that each core may process different numbers of threads (e.g., eight threads per core). The example core 36f includes an instruction fetch and scheduling unit (IFU) 44 that is coupled to a memory management unit (MMU) 40, the load store unit (LSU) 41 and at least one instruction execution unit (IEU) 45. Each execution unit 45 is also coupled to the LSU 41, which is coupled to send data back to each execution unit 45. Additionally, the LSU 41, IFU 44 and MMU 40 are coupled (through an interface) to the crossbar 34.

Each processor core 36a-36h is in communication with crossbar 34 which manages data flow between cores 36 and the shared L2 cache 33, and which may be optimized for processor traffic where it is desirable to obtain extremely low latency. The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue data requests and/or responses, such that requests and responses may not block other activity while waiting for service. Additionally, in one embodiment crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34.

The shared L2 cache 33 accepts requests from the processor cores 36 on the processor to cache crossbar (PCX) 34 and responds on the cache to processor crossbar (CPX) 34. The L2 cache 33 includes four banks that are shared by the processor cores. It should be appreciated that, by sharing L2 cache banks, concurrent access may be made to the multiple banks, thereby defining a high bandwidth memory system. The invention is not limited to four L2 cache banks or to any particular size, but the illustrated embodiment should be sufficient to provide enough bandwidth from the L2 cache to keep all of the cores busy most of the time. In the illustrated embodiment, L2 cache 33 may be organized into four or eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 33 may be a four-way banked 3 megabyte (MB) cache, where each bank (e.g., 33a) is set associative, and data is interleaved across banks, although other cache sizes and geometries are possible and contemplated.

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in L2 cache (i.e., a "miss"), the data is fetched from main memory 31 and a copy of the data and its address is stored in the L2 cache 33 for future access.

The L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices.

Peripheral interface 38 may be configured to coordinate data transfer between processor chip 30 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment, each of cores 36 may be configured to perform fine-grained multithreading, in which each core may select instructions to execute from among a pool of instructions corresponding to multiple threads, such that instructions from different threads may be scheduled to execute adjacently. For example, in a ninelined embodiment of core 36f employing fine-grained multithreading, instructions from different threads may occupy adjacent pipeline stages, such that instructions from several threads may be in various stages of execution during a given core processing cycle.

Figure 4:
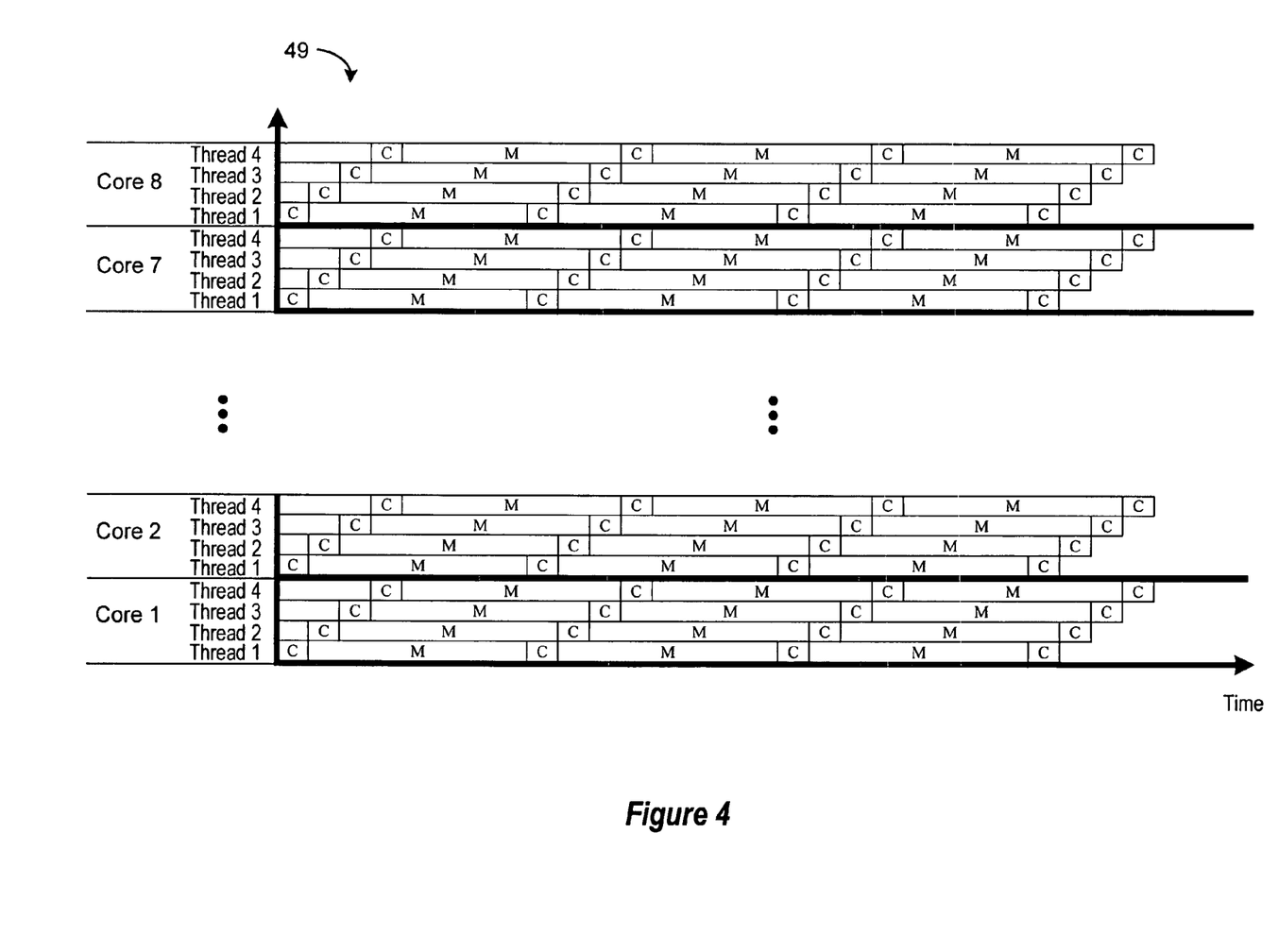
FIG. 4 is a timing diagram illustrating an execution flow of a vertical multithreaded multiprocessor in accordance with an illustrative embodiment of the invention.

FIG. 4 is a timing diagram illustrating execution flow of a vertical multithreaded multiprocessor embodiment of the invention using a high throughput architecture with eight processor cores (Core 1-Core 8), each having four threads. While the present invention may be implemented on a vertical multithreaded processor where a memory space (e.g., L2 cache) is shared by the threads, the invention may also be implemented as a horizontal multithreaded processor where the memory space is not shared by the threads, or with some combination of vertical and horizontal multithreading. In FIG. 4, the execution flow for a given vertical threaded processor (e.g., Core 1) includes execution of multiple threads (e.g., Threads 1-4). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for Thread 3 and Thread 4. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline.

In accordance with a selected embodiment of the present invention, the processor cores can be replicated a number of times in the same area. This is also illustrated in FIG. 4, which illustrates the timing diagram for an execution flow of a vertically threaded processor using a technique called chip multiprocessing. This technique combines multiple processor cores on a single integrated circuit die. By using multiple vertically threaded processors—each of which (e.g., Core 1) is vertically threaded—a processor system is formed with augmented execution efficiency and decreased latency in a multiplicative fashion. The execution flow 49 illustrated in FIG. 4 for a vertical threaded processor includes execution of threads 1-4 on a first processor core (Core 1), execution of threads 1-4 on a second processor core (Core 2), and so on with processor cores 3-4. Execution of threads 1-4 on the first processor core (Core 1) illustrates vertical threading. Similarly, execution of threads 1-4 on the second processor (Core 2) illustrates vertical threading. Where a single system or integrated circuit includes more than one processor core, the multiple processor cores executing multiple threads in parallel is a chip multithreading (CMT) processor system. The combination of multiple cores with vertical multithreading increases processor parallelism and performance, and attains an execution efficiency that exceeds the efficiency of a single core with vertical multithreading. The combination of multiple vertically threaded cores also advantageously reduces communication latency among local (on-chip) multi-processor tasks by eliminating much signaling on high-latency communication lines between integrated circuit chips. Multicore multithreading further advantageously exploits processor speed and power improvements that inherently result from reduced circuit sizes in the evolution of silicon processing.

With the use of multiple vertically threaded processors, each processor core pipeline overlaps the execution of multiple threads to maximize processor core pipeline utilization. As will be appreciated, the multiplicity of thread operations from a vertically threaded processor (e.g., Core 1) will require a sequencing of the thread executions that is both fair and efficient. For example, a thread that has become unavailable due to a long latency operation can have its execution unduly delayed if priority is granted on the basis of current readiness. Examples of long latency operations include load, branch, multiply or divide operations. In addition, a thread can become unavailable due to a pipeline stall, such as a cache miss, a trap or other resource conflicts.

Figure 5:
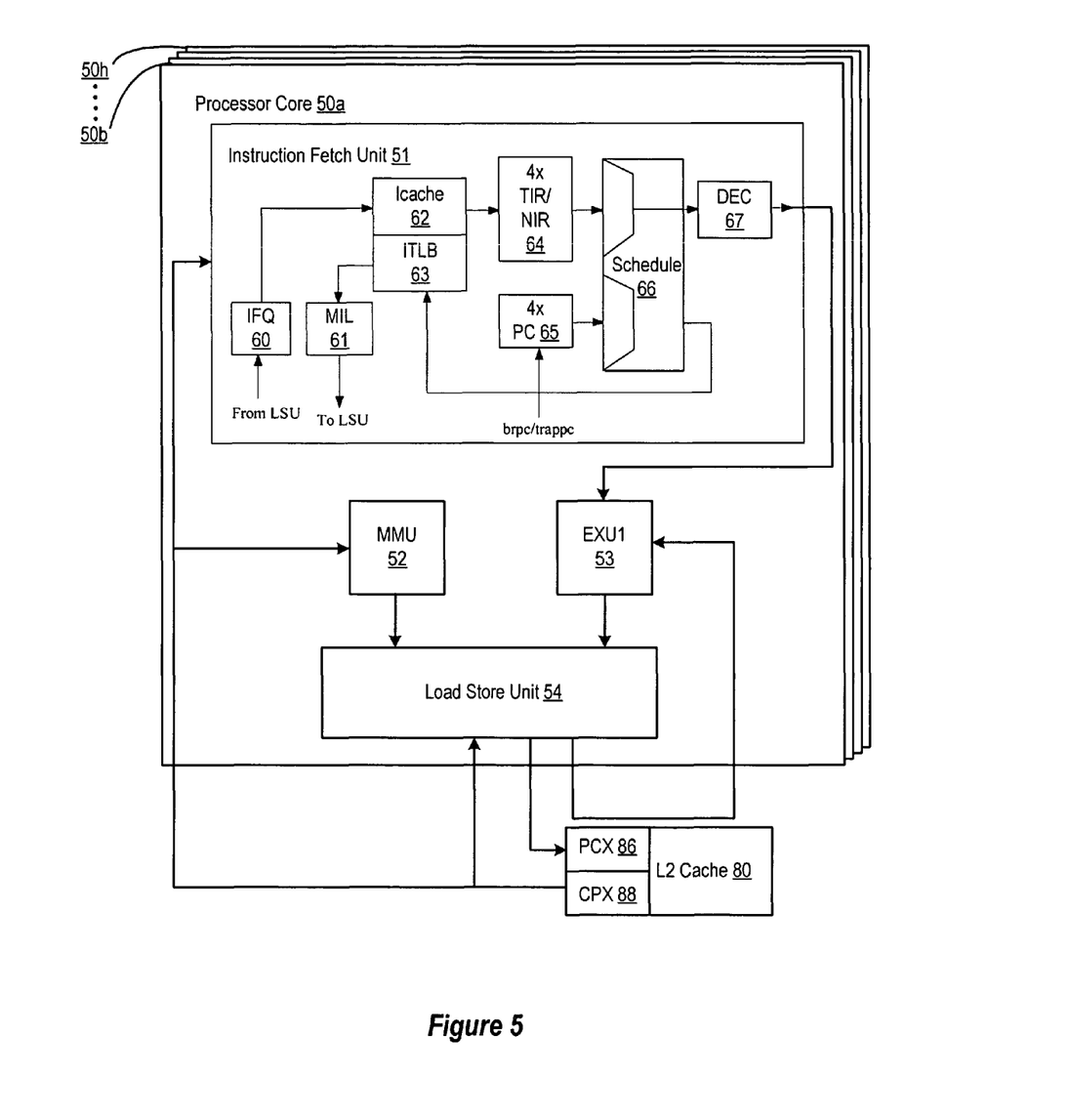
FIG. 5 is a simplified schematic block diagram of a processor core in which thread scheduling is provided in accordance with various embodiments of the invention.

The present invention may be applied in a variety of applications to schedule thread execution in a multithreaded, high throughput processor core in a way that ensures no deadlocks or livelocks, while maximizing aggregate performance and ensuring fairness between threads. While the thread selection functionality may be implemented anywhere in the front-end of the processor pipeline, FIG. 5 depicts a processor core 50*a* in which thread scheduling is implemented in the instruction fetch unit (IFU) 51. In particular, the depicted core 50*a* includes an IFU 51 that is coupled to a memory management unit (MMU) 52 and at least one instruction execution unit (EXU1) 53. The instruction fetch unit may include logic configured to translate virtual data addresses (VA) to physical addresses (PA), such as an Instruction Translation Lookaside Buffer (ITLB) 63. Each execution unit 53 is coupled to a load store unit (LSU) 54. Additionally, LSU 54, IFU 51 and MMU 54 are coupled directly or indirectly to the L2 cache 80 via crossbar 86, 88.

In operation, the instruction fetch unit (IFU) 51 retrieves two instructions for each thread from the instruction cache 62 and writes the instructions into two instruction registers (TIR/NIR 64)—a thread instruction register (TIR) for holding the current stage instruction, and a next instruction register (NIR) for holding the instruction at the next PC. If the next required instruction is not stored in the instruction cache 62, the IFU 51 fetches the instruction from the instruction fill queue (IFQ) 60 which buffers instructions obtained from the LSU 54. The memory location of the next instruction to be retrieved for each thread is specified in the program counter (PC) register 65. For example, the program counter may be simply incremented to identify the next memory address location or may be specified by the branch program counter (brpc) or trap program counter (trappc) signals provided to the PC register 65. When the location for the next instruction is in the instruction cache 62, the Instruction Translation Lookaside Buffer (ITLB) 63 may be used to specify the instruction cache memory address for the next instructions. Thus, the current instruction is stored in the instruction registers (TIR/NIR 64), and the associated program counter is stored in a PC register 65. The scheduling unit 66 selects a thread to execute from among the different threads, retrieves the selected thread's instruction and program counter from the TIR and PC registers 64, 65, and provides the selected thread's instruction and program counter to the decode unit 67 which decodes the instruction and supplies the pre-decoded instruction to the execution unit 53. As will be appreciated, after an instruction retrieved from the TIR is scheduled, the instruction in the NIR is moved to the TIR; however, during fill operations, the instruction cache may be bypassed and the instruction is written to the TIR, but not the NIR. Each execution unit 53 includes an arithmetic logic unit (ALU) for performing multiplication, shifting and/or division operations. In addition, the execution unit 53 processes and stores thread status information in integer register files. Execution unit results are supplied to the LSU 54 which handles memory references between the processor core, the L1 data cache and the L2 cache. The LSU 54 also receives a listing of any instructions that miss in the instruction cache 62 from the miss instruction list buffer 61.

Figure 6:
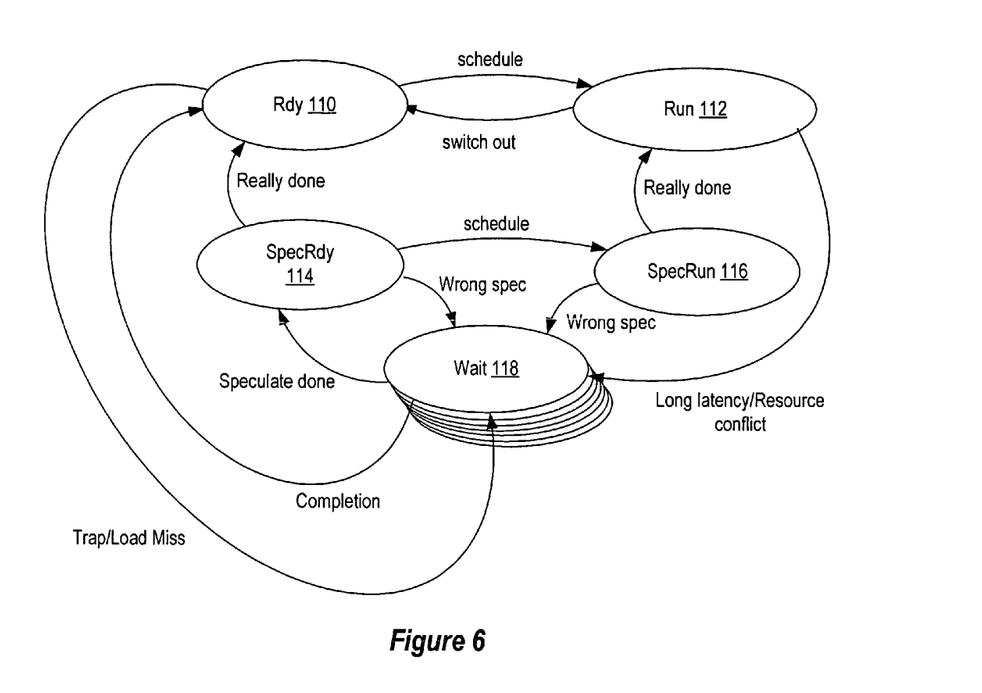
FIG. 6 depicts the basic and speculative thread states in an exemplary multithreaded processor system in which thread scheduling is provided in accordance with various embodiments of the present invention.

Turning now to FIG. 6, the basic and speculative thread states are depicted in connection with an exemplary multithreaded processor system in which thread scheduling is provided in accordance with various embodiments of the present invention. In the depicted example, each thread can be in one of eleven different active states, including a ready (Rdy) state 110, a run (Run) state 112, a speculative ready (SpecRdy) state 114, a speculative run (SpecRun) state 116 and any one of seven different wait (Wait) states 118. The wait states 118 may include an instruction fill wait state (waiting for an Ifill operation), a store buffer full wait state (waiting for room in a store buffer), a long latency or resource conflict wait state (waiting for a long latency operation, where all resource conflicts arise as a result of a long latency), or any combination of the foregoing wait states. In accordance with the present invention, the status for a particular thread may be tracked as it moves from one state to another. For example, an instruction (e.g., a load instruction) for a thread that is in a ready state 110 transitions to a run state 112 when it is scheduled for execution, but may be transitioned to a wait state 118 if there is long latency or other resource conflict that prevents execution of the instruction, or may transition back to the, ready state 110 if the thread is switched out of order. Once in the wait state 118, the thread status returns to the ready state 110 when conditions causing a thread to be stalled clear (e.g., the requested data is ready for loading). Alternatively, a thread in the ready state 110 can transition to the wait state 118 if there is a software trap or load miss from the cache. In accordance with the present invention, speculative states are also tracked and scheduled by introducing speculative states 114, 116 whereby a thread may be speculatively scheduled for execution, thereby improving usage of the execution pipe. For example, a thread in the wait state 118 transitions to the speculative ready state 114 by speculating when the condition stalling the thread will be cleared (e.g., assuming an L1 cache hit with a known arrival time), and transitions further to the speculative run state 116 by speculating when the thread would be scheduled for execution. As another example, a load instruction is speculated as a cache hit and the thread is switched in with a lower priority. If the speculation was wrong, the thread state returns to the wait state 118, but if the speculation was right and the stall condition cleared as predicted (e.g., the data or instruction was actually in the L1 cache), the thread transitions to the ready state 100 and run state 112 for execution.

Figure 7:
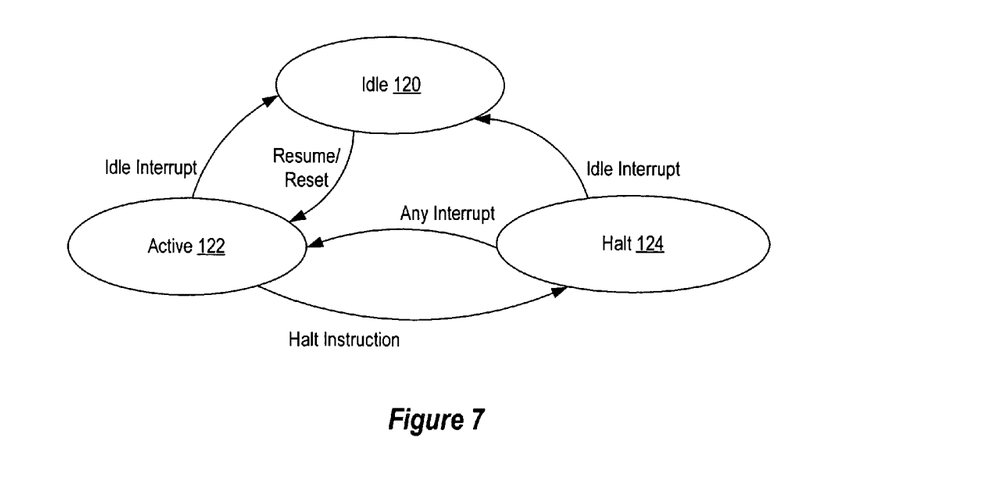
FIG. 7 depicts the active and suspended thread states in an exemplary multithreaded processor system in which thread scheduling is provided in accordance with various embodiments of the present invention.

In addition to the active thread states 122, FIG. 7 shows that each thread may also be in a suspended or inactive state, such as an idle state 120 or a halt state 124. In the idled state 120, the thread is dead to the world and a resume or reset is required to return to the active state 122. While the idle state 120 is not normally used in programming applications, an operating system might catch a thread error and use the idle state 120 to shut down the thread for debugging, or might use the idle state to control the power consumption of a processor core if excessive heat is detected at the core. The halt state 124 is used to temporarily stop a thread until an external interrupt is received, and may be used in programming applications, such as power save applications or other applications were a specific response is expected. For example, with web server programs where a form is sent out to a user to be filled out and returned, the halt state 124 is used to suspend the thread until the form return generates an interrupt for the thread. As illustrated, an active thread transitions to the idle state 120 when an idle interrupt for the thread is processed, and only returns to the active state 122 when a resume or reset interrupt is processed. Alternatively, an active thread transitions to the halt state 124 when a halt instruction for the thread is processed. Once in a halt state 124, the thread can transition to the idle state when an idle interrupt for the thread is processed, or can return to the active state 122 when any other interrupt is processed.

Figure 8:
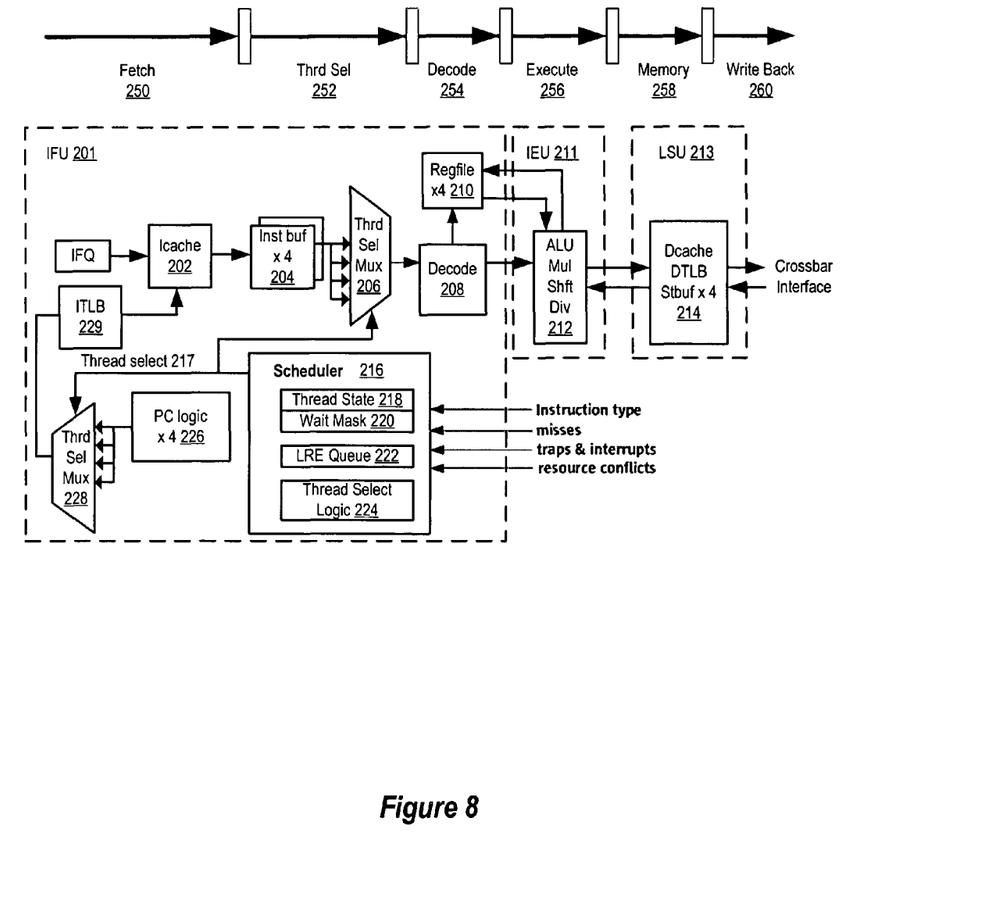
FIG. 8 depicts an exemplary dataflow through a processor pipeline where thread selection logic is used to prioritize threads for processing in the pipeline.

Turning now to FIG. 8, an exemplary dataflow through a processor pipeline is depicted wherein thread scheduler 216 is used to prioritize threads for processing in the pipeline based on the current thread status. While other pipeline structures may be used, FIG. 8 depicts the six-stage pipeline diagram showing the flow of integer instructions through one embodiment of a core (e.g., 50a), whereby multiple threads are pipelined so that processing of new instructions may begin before older instructions have completed. As a result, multiple instructions from various threads may be in various stages of processing during a given core execution cycle. In the illustrated embodiment, execution of integer instructions is divided into six stages, denoted as the Fetch (F) stage 250, the Schedule stage (S) 252, the Decode (D) stage 254, the Execute (E) stage 256, the Memory (M) stage 258 and the Writeback (WB) stage 260. In other embodiments, it is contemplated that different numbers of pipe stages corresponding to different types of functionality may be employed. It is further contemplated that other pipelines of different structure and depth may be implemented for integer or other instructions.

The first three stages (F-S-D) of the illustrated integer pipeline 250-254 may generally correspond to the functioning of instruction fetch unit 201, and function to deliver instructions to the execution unit 211. The final three stages (E-M-WB) of the illustrated integer pipeline may generally correspond to the functioning of the execution unit 211 and LSU 213. On a predetermined basis (such as at each cycle), the current status of each thread is recorded by the scheduler 216, which receives, for each thread, information concerning instruction type, any cache misses, traps and interrupts and resource conflicts. This information is stored or tracked in a thread status register 218 in the pipeline front-end, while the current wait state for each thread is tracked or stored in a wait mask or status register 220 in the pipeline front-end. A thread state register 218 may be used to track a run state, a ready state, a speculative run state, and a speculative ready state for each thread. In addition, a busy register 218 may be used to keep track of usage of long latency shared resources. Threads which are waiting for the availability of a shared resource are waitlisted in the wait mask register 220 for each resource to ensure there are no deadlocks or livelocks between threads vying for access to shared resources. To this end, the wait mask register may be used to track a plurality of wait states for each thread. When conditions causing a thread to be stalled clear, the scheduler 216 updates the thread state accordingly. Thus, the thread scheduler 216 keeps track of thread state information, including the order in which threads have been executed, whether a thread is ready to be scheduled for execution, whether the thread is currently executing, if it is not ready, then what condition is keeping it from executing and so on.

In the example implementation depicted in FIG. 8, the instruction fetch and scheduling unit (IFU) 201 retrieves instructions and program counter information for each thread, stores the instructions in the instruction cache 202 and in the instruction buffers 204 and stores the associated program counter in a PC logic unit 226. For each thread, the instruction register 204 may include a thread instruction register (TIR) for holding the current stage instruction, and a next instruction register (NIR) for holding the instruction at the next PC. The status of each thread is monitored and stored by the scheduler 216. Based upon thread status information stored in the thread state register 218 and wait mask register 220 and the ordering information stored in the LRE Queue 222, thread select logic 224 in the scheduler 216 selects a thread to execute from among the different threads, and issues a thread select signal 217 to the thread select multiplexer 206 to retrieve the selected thread's instruction from the instruction buffer 204. The retrieved instruction is sent to the decoder 208 which decodes the instruction and supplies the pre-decoded instruction to the execution unit 211. In addition, the thread select signal 217 is issued to the thread select multiplexer 228 to control delivery of program counter information to the instruction cache 202, such as by specifying the program counter location for the next instruction in the instruction cache 202 that is to be translated by the ITLB 229. Each execution unit 211 includes an arithmetic logic unit (ALU) for performing multiplication, shifting and/or division operations. In addition, the execution unit 211 processes and stores thread status information in integer register files 210. Execution unit results are supplied to the LSU 213 which handles memory references between the processor core, the L1 data cache and the L2 cache. The LSU 213 also buffers stores to the cache or memory using a store buffer for each thread.

The current thread status information recorded in the thread state and wait mask registers 218, 220 is used by the thread scheduler 216 to schedule thread execution in a way that ensures fairness by giving priority to the thread that was least recently scheduled. In an exemplary embodiment, thread selection logic 224 processes the thread status information from the thread state and wait mask registers 218, 220, and also maintains a thread order register or queue (e.g., LRE Queue 222) in which the thread identifier for a given thread is moved to the front of the queue when the given thread is executed, meaning that the least recently executed thread is at the back of the queue. In an example embodiment, the thread select logic 224 may implement a scheduling algorithm whereby a thread can only be scheduled if it is in a ready state, a speculative ready state, a run state or a speculative run state. As between threads that qualify for scheduling, the thread select logic 224 may allocate the highest execution priority using the priority rule, Rdy>SpecRdy>Run=SpecRun, or alternatively may allocate the highest execution priority using the priority rule, Idle (with a reset or resume interrupt pending) >Rdy>SpecRdy>Run=SpecRun. As will be appreciated, this sequencing of priorities effectively assigns higher priority to the least recently executed thread, with a lower priority "run" state likely having been more recently executed than a higher priority "ready" state. In the event of any priority tie between two threads that are Rdy or SpecRdy, the thread select logic 224 may allocate the higher execution priority to the thread that was least recently executed. As will be appreciated, there will be no priority ties between threads that are in the Run or SpecRun states when only one thread is running in the thread select stage at a time. Within Idled threads, priority may be allocated in any desired way, such as using thread identifiers to allocate priority with an ad hoc rule (e.g., T0>T1>T2>T3). While such a thread allocation is not "fair," it is acceptable given the relative infrequency of idled threads. By assigning higher priority to the Ready and SpecRdy states, the processor makes frequent switches between threads, thereby reducing the probability of being hit by a stall. In comparison, if the Run and SpecRun states were given priority, a thread switch would occur only after a stall is detected, thereby needlessly consuming processor cycles before stall detection occurs.

Figure 9:
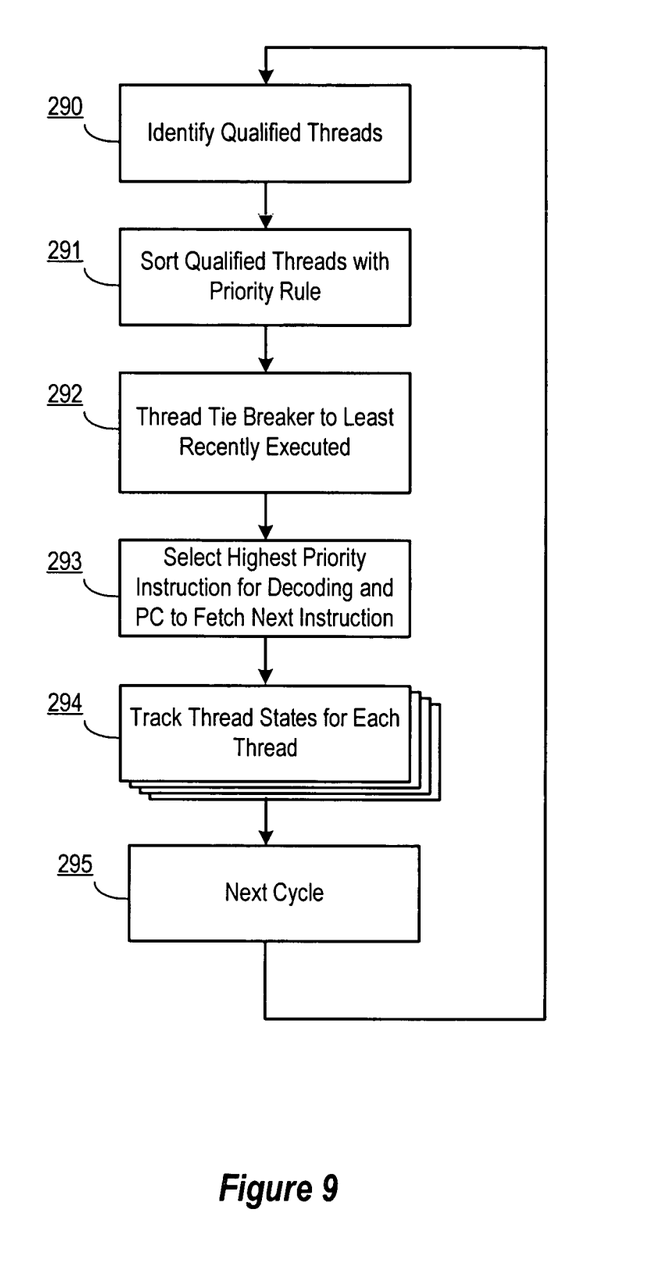
FIG. 9 an exemplary flow methodology for implementing thread scheduling operations.

Turning now to FIG. 9, an exemplary flow methodology for implementing an efficient and fair thread scheduling system and functionality is illustrated. As will be appreciated, the methodology illustrated in FIG. 9 shows the steps for prioritizing multiple threads for instruction selection and execution, and these steps can occur as a sequence at the beginning or end of each processing cycle. Whether implemented on a single processor core that executes multiple threads or on each core of a multithreaded multiprocessor, the disclosed prioritization steps allow threads that share a common processing resource to be scheduled for execution in a way that ensures correctness, fairness and increased performance. In addition, it will be appreciated that the methodology of the present invention may be thought of as performing the identified sequence of steps in the order depicted in FIG. 9, though the steps may also be performed in parallel, in a different order or as independent operations that separately monitor thread status information and sort the threads for execution based on the current thread status information as described herein.

The description of the method can begin at step 290, where the threads that are qualified to be ranked or sorted are identified. For example, if the scheduling algorithm ranks only active threads, then the thread select logic identifies which threads are in a ready state, a speculative ready state, a run state or a speculative run state. Alternatively, other thread states may qualify under the thread select logic, such as threads that are in an idle state with an interrupt pending.

Once the qualified threads are identified, they are sorted at step 291 by the thread select logic using a predetermined priority rule. Will any desired prioritization rule may be used, in accordance with a selected embodiment, the thread select logic may implement a least recently executed algorithm to allocate the highest execution priority to any thread in the idle state with an interrupt pending, the next highest priority to a thread in the ready state, the next highest priority to a thread in the speculative ready state, and the lowest priority to any thread in the run state or the speculative run state. However, any subset of the foregoing prioritizations may be used, and as will be appreciated, the prioritization rules can be implemented in any of a variety of ways that are suitable to provide a desired prioritization function.

At step 292, any priority tie between threads is broken by allocating the higher priority to the thread that was least recently executed. An efficient mechanism for monitoring how recently a thread has been executed is to maintain a thread order queue in which the thread identifier for a given thread is moved to the front of the queue when the given thread is executed. The result is that the least recently executed thread is at the back of the queue. In addition or in the alternative, different prioritization rules can be used for breaking ties between inactive threads (e.g., idled threads), such as by allocating priority using a predetermined ranking of thread identifiers (e.g., T0>T1>T2>T3).

Once the thread with the highest priority is identified, the current instruction and PC for the identified thread is selected for decoding and execution, and the program counter for the next instruction in the identified thread is selected at step 293. Thus, instruction scheduling occurs at the same time that the next instruction is fetched so that if the next instruction is available in the NIR, then no fetch operation is needed and the scheduler merely schedules the correct instruction from the NIR. At this point in the sequence illustrated in FIG. 9, the thread states for each thread may be monitored (as shown in step 294) to keep track of thread state information, such as whether it is ready to be scheduled for execution, whether it is currently executing, what condition is keeping the thread from executing if it is not ready, and/or when such a condition clears, etc. As will be appreciated, the thread tracking step may occur at the end of each processor cycle (as indicated at step 295), or may instead occur at the beginning of the sequence of steps depicted in FIG. 9.

As set forth above, a method and apparatus for scheduling multiple threads for execution in a shared microprocessor pipeline is described. For clarity, only those aspects of the processor system germane to the invention are described, and product details well known in the art are omitted. For the same reason, the computer hardware is not described in further detail. It should thus be understood that the invention is not limited to any specific logic implementation, computer language, program, or computer. While various details are set forth in the above description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the present invention has been particularly described with reference to FIGS. 1-9 and with emphasis on certain exemplary prioritization techniques, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A multithreaded processor comprising:
   an instruction buffer for storing instructions for a plurality of threads;
   at least one processor core for executing instructions stored in the instruction buffer; and
   a scheduler for selecting which of the plurality of threads will have an instruction scheduled for execution by monitoring a current thread state for each of the plurality of threads to determine whether each thread is ready to be scheduled for execution, whether each thread is currently executing and what condition is preventing each thread from executing, where the scheduler selects a first thread having a current thread state indicating that the first thread was least recently scheduled,
   wherein the scheduler selects which of the plurality of threads will have an instruction scheduled for execution by applying a priority rule that gives a higher priority to a thread that is in a ready state, a lower priority to a thread that is in a speculative ready state, and a lowest priority to a thread that is in a run state,
   wherein the scheduler selects which of the plurality of threads will have an instruction scheduled for execution by applying a priority rule that gives a highest priority to a thread that is in an idle state with an interrupt pending.

2. The multithreaded processor of claim 1, where the instruction buffer stores up to a plurality of instructions for each of four threads as part of an instruction fetch unit for the multithreaded processor.

3. The multithreaded processor of claim 1, where the scheduler comprises:
   a thread state register for tracking a run state, ready state, speculative run state, and speculative ready state for each thread; and
   a wait mask register for tracking a plurality of wait states for each thread.

4. The multithreaded processor of claim 1, where the scheduler comprises a thread order register for tracking which thread has been least recently executed.

5. The multithreaded processor of claim 1, where the scheduler updates a current thread state when conditions causing a thread to be stalled clear.

6. The multithreaded processor of claim 1, where the scheduler monitors a current thread state for each of the plurality of threads to determine whether each thread is in an idle state or a halt state.

7. The multithreaded processor of claim 1, where the scheduler monitors a current thread state for each of the plurality of threads to determine whether each thread is in any of a plurality of wait states.

8. The multithreaded processor of claim 1, where the plurality of wait states comprise a first state for waiting for an instruction fill operation, a second state for waiting for room in a store buffer and a third state for waiting for a long latency operation.

9. The multithreaded processor of claim 1, where the scheduler monitors a current thread state to detect a speculative thread state where completion is being predicted whereby a thread having a speculative thread state is scheduled for execution assuming completion.

10. A method for scheduling multiple threads for execution on a shared processor pipeline, comprising:
    maintaining at least one thread status register to keep track of thread states for each of a plurality of threads, said thread states comprising a ready state, a run state and at least one wait state;
    maintaining a thread order register for the plurality of threads to track a thread execution order defining which thread was least recently executed;
    scheduling any one or more of the plurality of threads for execution that are in the ready state or the run state by assigning a higher priority to a thread that is in a ready state and a lower priority to a thread that is in a run state, with priority between any two or more threads in a ready state being given to whichever thread was least recently executed, wherein the scheduling selects which of the plurality of threads will have an instruction scheduled for execution by applying a priority rule that gives a higher priority to a thread that is in a ready state, a lower priority to a thread that is in a speculative ready state, and a lowest priority to a thread that is in a run state, wherein the scheduling selects which of the plurality of threads will have an instruction scheduled for execution by applying a priority rule that gives a highest priority to a thread that is in an idle state with an interrupt pending.

11. The method of claim 10, wherein the thread states tracked in the thread status register further comprise a speculative ready state and wherein priority between any two or more threads in a speculative ready state is given to whichever thread was least recently executed.

12. The method of claim 10, wherein the thread states tracked in the thread status register further comprise a predetermined idle state, such that the scheduling of any one or more of the plurality of threads for execution that are in the predetermined idle state, ready state or the run state is determined by assigning a highest priority to the thread that is in a predetermined idle state, a higher priority to a thread that is in a ready state and a lowest priority to a thread that is in a run state.

13. The method of claim 12, where priority between any two or more threads in the predetermined idle state is given based on thread identifier information for each thread.

14. The method of claim 10, further comprising updating the thread status register when a condition causing a wait state clears.

15. The method of claim 10, wherein the at least one wait state comprises a first state for waiting for an instruction fill operation, a second state for waiting for room in a store buffer and a third state for waiting for a long latency operation.

16. The method of claim 10, wherein the thread states tracked in the thread status register comprise a ready state, a speculative ready state, a run state, a speculative run state and at least one wait state, such that the scheduling of any one or more of the plurality of threads for execution that are in the ready state, the speculative ready state, the run state, or the speculative run state is determined by assigning a higher priority to a thread that is in a ready state, a lower priority to a thread that is in a speculative ready state, and a lowest priority to a thread that is in either a run state or a speculative run state, with priority between any two or more threads in a ready state or in the speculative ready state being given to whichever thread was least recently executed.

17. A non-transitory computer readable medium having stored thereon one or more executable instructions which, when executed by at least one shared processing device, cause the at least one processing device to schedule execution of multiple threads on said processing device by:

tracking a thread state for each of a plurality of threads, where said thread state may comprise a ready state, a speculative ready state, a run state and a speculative run state;

scheduling for execution any one or more of the plurality of threads by assigning a higher priority to a thread that is in a ready state, a lower priority to a thread that is in a speculative ready state, and a lowest priority to a thread that is in either a run state or a speculative run state, with priority between any two or more threads in a ready state or in the speculative ready state being given to whichever thread was least recently executed, wherein the scheduling selects which of the plurality of threads will have an instruction scheduled for execution by applying a priority rule that gives a higher priority to a thread that is in a ready state, a lower priority to a thread that is in a speculative read state, and a lowest priority to a thread that is in a run state, wherein the scheduling selects which of the plurality of threads will have an instruction scheduled for execution by applying a priority rule that gives a highest priority to a thread that is in an idle state with an interrupt pending.

18. The non-transitory computer readable medium of claim 17, wherein the instructions cause the shared processing device to track at least one wait state for each of the plurality of threads in a wait register.

* * * * *

UNITED STATES PATENT AND TRADEMARK OFFICE
CERTIFICATE OF CORRECTION

PATENT NO. : 8,756,605 B2  
APPLICATION NO. : 11/015055  
DATED : June 17, 2014  
INVENTOR(S) : Aingaran et al.

Page 1 of 1

It is certified that error appears in the above-identified patent and that said Letters Patent is hereby corrected as shown below:

On the Title Page

On page 2, column 2, under Other Publications, line 13, Delete "UltraSparc®" and insert -- UltraSPARC® --, therefor.

On page 2, column 2, under Other Publications, line 15, Delete ""UltraSparc®" and insert -- "UltraSPARC® --, therefor.

In the Specification

In column 3, line 27, delete "as a a" and insert -- as a --, therefor.

In column 6, line 66, delete "ninelined" and insert -- pipelined --, therefor.

In column 8, line 25, delete "(EXUI)" and insert -- (EXU1) --, therefor.

In column 8, line 25, delete "unit" and insert -- unit 51 --, therefor.

In column 12, line 34, delete "Will" and insert -- While --, therefor.

In the Claims

In column 16, line 31, in Claim 17, delete "read" and insert -- ready --, therefor.

Signed and Sealed this  
Third Day of February, 2015

Michelle K. Lee  
*Deputy Director of the United States Patent and Trademark Office*